US008267166B2

(12) United States Patent
Damsleth et al.

(10) Patent No.: US 8,267,166 B2
(45) Date of Patent: Sep. 18, 2012

(54) ARRANGEMENT AND METHOD FOR HEAT TRANSPORT

(75) Inventors: Per Damsleth, Høvik (NO); Rune Killie, Oslo (NO); Per Kristian Grønlund, Nærsnes (NO)

(73) Assignee: Vetco Gray Scandinavia AS, Sandvika (NO)

( * ) Notice: Subject to any disclaimer, the term of this patent is extended or adjusted under 35 U.S.C. 154(b) by 662 days.

(21) Appl. No.: 11/887,939

(22) PCT Filed: Apr. 4, 2006

(86) PCT No.: PCT/IB2006/000779
§ 371 (c)(1),
(2), (4) Date: Dec. 1, 2008

(87) PCT Pub. No.: WO2006/106406
PCT Pub. Date: Oct. 12, 2006

(65) Prior Publication Data
US 2009/0090500 A1    Apr. 9, 2009

Related U.S. Application Data

(60) Provisional application No. 60/668,060, filed on Apr. 5, 2005.

(51) Int. Cl.
*E21B 36/00* (2006.01)
(52) U.S. Cl. .................. 166/57; 166/302; 165/181
(58) Field of Classification Search ............ 166/57, 166/61, 302; 137/340; 165/10, 181–185, 165/903
See application file for complete search history.

(56) References Cited

U.S. PATENT DOCUMENTS

| | | | | | |
|---|---|---|---|---|---|
| 2,731,808 | A | * | 1/1956 | Stark | 62/165 |
| 2,886,746 | A | * | 5/1959 | Saby | 257/715 |
| 3,319,202 | A | * | 5/1967 | Lockie | 336/61 |
| 3,366,173 | A | * | 1/1968 | McIntosh | 166/356 |

(Continued)

FOREIGN PATENT DOCUMENTS

DE    10308801 A1    9/2004

(Continued)

OTHER PUBLICATIONS

Merriam-Webster Dictionary definition of "lower", accessed Feb. 17, 2011 via www.m-w.com.*

(Continued)

*Primary Examiner* — Daniel P Stephenson
*Assistant Examiner* — Blake Michener
(74) *Attorney, Agent, or Firm* — Venable LLP; Eric J. Franklin

(57) ABSTRACT

An arrangement for heat transport used for thermally insulating, or cooling, one or several elements. A casing is arranged to enclose a medium having heat-storing or cooling capacity. The casing has an internal space for receiving the element or elements and the medium with the medium surrounding the element or elements. The arrangement includes guides arranged in the internal space of the casing so as to guide the medium in the internal space such that a circulation and mixing of the fluid will be generated essentially throughout the internal space under the action of occurring temperature differences in the medium, whereby the natural tendency for temperature stratification of the medium is counteracted or eliminated. A corresponding method, the use of an arrangement for protecting a subsea installation or a part thereof from cooling, and use of an arrangement for efficient cooling an electrical appliance.

1 Claim, 2 Drawing Sheets

U.S. PATENT DOCUMENTS

| | | | | |
|---|---|---|---|---|
| 3,472,314 | A | * | 10/1969 | Balch ........................ 165/104.19 |
| 3,626,080 | A | * | 12/1971 | Pierce .......................... 174/15.1 |
| 3,685,583 | A | * | 8/1972 | Phares .......................... 166/302 |
| 3,768,547 | A | * | 10/1973 | Best ................................ 165/45 |
| 3,777,502 | A | * | 12/1973 | Michie et al. .................. 62/50.7 |
| 3,782,452 | A | * | 1/1974 | Ceplon .......................... 165/135 |
| 3,886,976 | A | * | 6/1975 | Kardas et al. ................... 138/38 |
| 3,901,269 | A | * | 8/1975 | Henderson .................... 137/340 |
| 3,986,550 | A | * | 10/1976 | Mitsuoka ................. 165/104.21 |
| 4,280,045 | A | * | 7/1981 | Blackmore ................... 219/540 |
| 4,294,078 | A | * | 10/1981 | MacCracken ..................... 62/59 |
| 4,407,351 | A | * | 10/1983 | Backlund ........................ 165/45 |
| 4,572,286 | A | * | 2/1986 | Fujii et al. ................. 165/104.29 |
| 4,653,579 | A | * | 3/1987 | Fujii et al. ................. 165/104.29 |
| 4,679,598 | A | | 7/1987 | Jee |
| 5,931,156 | A | * | 8/1999 | Wang et al. ................... 126/635 |
| 6,000,438 | A | | 12/1999 | Ohrn |
| 6,419,018 | B1 | | 7/2002 | Naquin et al. |
| 7,438,122 | B2 | * | 10/2008 | Hawranek ..................... 165/157 |
| 2001/0032718 | A1 | * | 10/2001 | Sheerin et al. ................ 165/130 |
| 2002/0153140 | A1 | | 10/2002 | Botrel |

FOREIGN PATENT DOCUMENTS

| | | | |
|---|---|---|---|
| GB | 2183326 A | * | 6/1987 |
| WO | WO-01/63088 A1 | | 8/2001 |

OTHER PUBLICATIONS

PCT/ISA/210—International Search Report—Jun. 29, 2006.
PCT/IPEA/409—International Preliminary Report on Patentability—Jul. 2, 2007.

\* cited by examiner

ARRANGEMENT AND METHOD FOR HEAT TRANSPORT

CROSS-REFERENCE TO RELATED APPLICATIONS

This application claims priority to U.S. provisional patent application 60/668,060 filed Apr. 5, 2005 and is the national phase under 35 U.S.C. §371 of PCT/IB2006/000779 filed Apr. 4, 2006.

FIELD OF THE INVENTION AND PRIOR ART

The present invention relates to an arrangement for heat transport used for thermally insulating one or several elements and an arrangement for cooling one or several elements. The invention also relates to a method. Furthermore, the invention relates to the use of an inventive arrangement for substantially delaying the cooling of subsea equipment or a part thereof, such as a pipe, a pipe section, a valve or a valve section of an oil and/or gas producing installation, as well as the use of an inventive arrangement for more efficient cooling of an electrical appliance, such as a power transformer or a high voltage/current switch or circuit breaker.

In connection with oil and gas producing installations it is well known that rapid cooling of the producing fluid during normal production and particularly during a temporary interruption of the production may result in the formation of hydrates, which may cause clogging of pipes or pipe connections. To delay cooling of the producing fluid in case of an interruption of the production, some form of thermal insulation and heat storage medium has to be provided to the element through which the producing fluid flows. Said element could for instance be a pipe, a manifold, a valve, a connector etc.

WO 01/63088 A1 discloses the use of a casing for thermally insulating one or several elements forming part of a subsea installation. The casing is arranged to enclose a fluid having heat-storing capacity, for instance in the form of seawater, and has an internal space for receiving said element or elements and said fluid with the fluid surrounding the element or elements so as to allow the fluid to protect, by means of heat stored in the fluid, the element or elements from cooling too rapidly. A problem encountered with this solution is that a hot element located in the middle of a volume of water enclosed in a casing will cause temperature stratification in the water due to the fact that cold water has a higher density than hot water and therefore will settle in the bottom part of the casing, which will limit natural convection to the upper section of the enclosed space thus impairing the heat storing efficiency of the fluid. The high temperature and natural convection fluid flow under such circumstances are limited to the boundary layer surrounding the element in question and a concentrated vertical column above it. Because mixing of hot and cold fluid is limited to the upper sections, the average temperature of the fluid will be lower than if cooler fluid in the lower sections were also heated and mixed with the upper fluid.

Temperature stratification will also ensue in a cooling medium that is enclosed in a casing surrounding an electrical appliance, such as a power transformer or a high voltage/current switch or circuit breaker arrangement. A power transformer is often cooled by being immersed in a dielectric medium such as oil. Here, the temperature stratification in the coolant will impair its cooling efficiency because the stagnant colder fluid at the bottom part of the casing is ineffective in transporting heat away from the transformer. A similar effect will occur in an enclosure containing a high voltage/current electrical switch or circuit breaker immersed in a dielectric medium such as nitrogen gas.

SUMMARY OF THE INVENTION

The object of the present invention is to reduce the above-indicated problem of temperature stratification in the fluid of an arrangement for thermally insulating or cooling one or several elements.

According to the inventive solution, the fluid movement in the internal space of the casing is extended to the bottom area by a guiding means in such a manner that a circulation and thereby mixing of the fluid will be generated essentially throughout said internal space under the action of occurring temperature differences in the fluid, said circulation and mixing eliminate temperature stratification in the fluid. Hereby, the natural tendency for temperature stratification is counteracted or eliminated in an automatic and very simple manner, without requiring any active, mechanical or power consuming devices for bringing about the desired fluid circulation and mixing in the internal space of the casing.

Further advantages as well as advantageous features of the arrangement and the method according to the present invention will appear from the following description and the dependent claims.

The invention also relates to the use of an inventive arrangement for protecting a subsea installation or a part thereof, such as a pipe, a pipe section, a valve or a valve section of an oil and/or gas producing installation, from too rapid cooling, as well as the use of an inventive arrangement for cooling an electrical appliance, such as an electrical power transformer or a high voltage/current switch or circuit breaker arrangement.

BRIEF DESCRIPTION OF THE DRAWINGS

With reference to the appended drawings, a specific description of preferred embodiments of the invention cited as examples follows below.

In the drawings.

DETAILED DESCRIPTION OF PREFERRED EMBODIMENTS OF THE INVENTION

Figure 1:
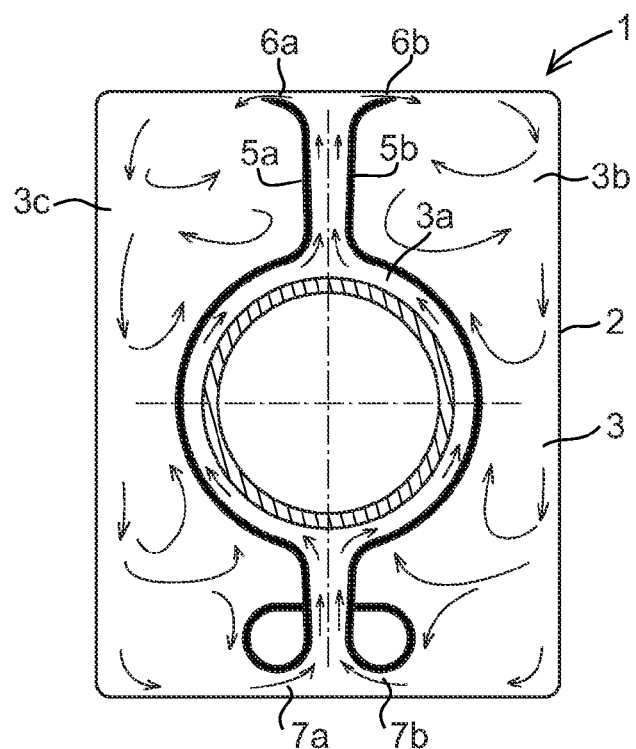
FIG. 1 is a schematical cross-sectional view of an arrangement according to an embodiment of the present invention.

An arrangement 1 according to an embodiment of the present invention is illustrated in FIG. 1. The arrangement 1 comprises a casing 2 arranged to enclose a fluid so as to prevent the fluid from flowing out into the surroundings. The fluid is received in an internal space 3 of the casing. The casing 2 is preferably of thermally insulating material and/or provided with layers of thermally insulating material where heat storage is needed, or of thermally uninsulated material (conducting material), where more efficient cooling is needed.

The casing 2 could for instance have a design of the type disclosed in WO 01/63088 A1, in the case where heat storage is needed.

According to a first alternative, the fluid enclosed in the casing 2 is a fluid having heat-storing capacity, for instance sea-water. In this case, the arrangement 1 is designed for thermally insulating one or several elements 4. Said element 4 or elements is together with the fluid received in the internal space 3 of the casing with the fluid surrounding the element 4 or elements so as to allow the fluid to protect, by means of heat stored in the fluid, the element or elements from too rapid cooling. The fluid is intended to be heated by heat emitted from the element 4 or elements during normal operation. If the heat input to the element 4 or elements and thereby the temperature thereof would be decreased for some reason, the heat stored in the enclosed fluid will slow down the cooling of the element 4 or elements caused by the medium, for instance cold sea-water, surrounding the casing 1. In this case, the arrangement 1 could, for instance, be arranged to protect a system in the form of a subsea installation or a part thereof, such as a pipe, a pipe section, a valve or a valve section of an oil and/or gas producing installation, from cooling. Consequently, said element 4 could for instance constitute a part of a subsea piping system for processing or transporting oil and/or gas.

According to a second alternative, the medium enclosed in the casing 2 is a dielectric medium, for instance oil as a coolant. In this case, the arrangement 1 is designed for efficient cooling of one or several elements 4. Said element 4 or elements is together with the medium received in the internal space 3 of the casing with the medium surrounding the element 4 or elements so as to allow the medium to cool the element or elements. In this case, the arrangement 1 could for instance be arranged to cool an element in the form of an electrical appliance, such as a power transformer, or a part thereof. Other examples may be high voltage/current switches or circuit breakers using dielectric medium, for example gas, as a coolant.

According to the invention, the arrangement 1 comprises guiding means 5a, 5b arranged in the internal space 3 of the casing 2 so as to guide the fluid in said internal space 3 in such a manner that a circulation and thereby mixing of the fluid will be generated essentially throughout said internal space 3 under the action of occurring temperature differences in the fluid, whereby temperature stratification in the fluid is substantially counteracted or eliminated. The flow of the fluid is caused by the prevailing temperature difference between hotter fluid and colder fluid in the internal space 3 of the casing. The guiding means 5a, 5b is arranged to passively guide the fluid flow between hot and cold areas in the internal space 3 of the casing 2 so that mixing of hotter fluid in the upper area of the internal space with colder fluid in the lower area of the internal space and thereby an equalization of the temperature of the enclosed fluid can occur. It is realized that the guiding means 5a, 5b should be so arranged that the fluid flow will be directed to reach essentially all parts of the inner space 3 of the casing that accommodate the fluid in question. The guiding means 5a, 5b should particularly be so arranged that the fluid flow will link the upper and lower parts of the inner space 3 of the casing.

The guiding means 5a, 5b is preferably arranged to divide the internal space 3 of the casing 2 into different zones 3a, 3b, 3c, which are in fluid communication with each other. In the embodiment illustrated in FIG. 1, the guiding means 5a, 5b is arranged to form a channel or a column 3a, which encloses at least a part of the element 4 or elements and through which fluid heated by said element or elements will flow upwards so as to be accelerated and to flow out forming jets through upper outlet(s) 6a, 6b of the channel 3a into an adjacent zone 3b, 3c that is in fluid communication also with a lower inlet 7a, 7b of the channel 3a. In this case, the enclosed fluid will consequently be guided by the guiding means 5a, 5b so as to flow up under acceleration through said channel 3a and out into an adjacent zone 3b, 3c via an upper outlet 6a, 6b of the channel and then flow down trough said adjacent zone 3b, 3c and back into the channel 3a via a lower inlet 7a, 7b of the channel. Hereby, a circulation and mixing of the fluid essentially throughout the internal space 3 of the casing will be generated. The eddies as created by the jets (as illustrated by arrows in FIG. 1) overcome the tendency for the fluid to stagnate with a temperature gradient. The hotter fluid mixes with cooler fluid throughout the internal space 3 to achieve a uniform temperature that is higher than the average temperature without the guiding means. The respective upper outlet 6a, 6b of the channel 3a is preferably located close to the top of the internal space 3 of the casing and arranged to direct the outflowing fluid in such a manner that relatively high velocity fluid flow (forming jets) along the upper wall of the casing 2 will be generated. The respective lower inlet 7a, 7b of the channel 3a is preferably located close to the bottom of the internal space 3 of the casing and shaped to provide minimum inflow resistance so as to enhance or maximise the inflow.

Figure 2:
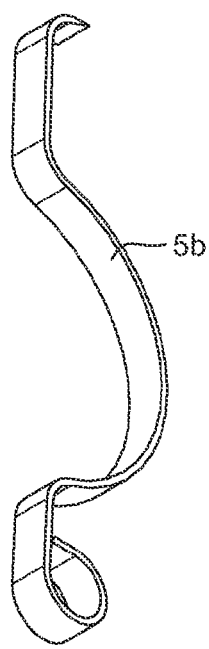
FIG. 2 is a perspective view of a guiding member included in the arrangement illustrated in FIG. 1.

The guiding means suitably comprises one or several guiding members 5a, 5b, preferably in the form of guiding plates. In the embodiment illustrated in FIG. 1, the guiding means consists of two oppositely arranged guiding members 5a, 5b. One of said guiding members 5b is illustrated in closer detail in FIG. 2.

It should be realized that the guiding means must be covered by other components in an assembly of transverse plates or other elements, or otherwise enclosed to prevent heated fluid from escaping transversely out of the guide arrangement.

For example, the guiding members 5a and 5b, as illustrated in the embodiment according to FIG. 1, is preferably arranged within a layered assembly of transverse plates (clamp components, heat dissipation plates, etc.) or in the form of an enclosed duct that isolates a vertical column of heated fluid (water) from cooler surrounding fluid (water) and is open at the top and bottom to link the cooler fluid at the bottom of the internal space 3 with the hotter fluid near the top.

Figure 3:
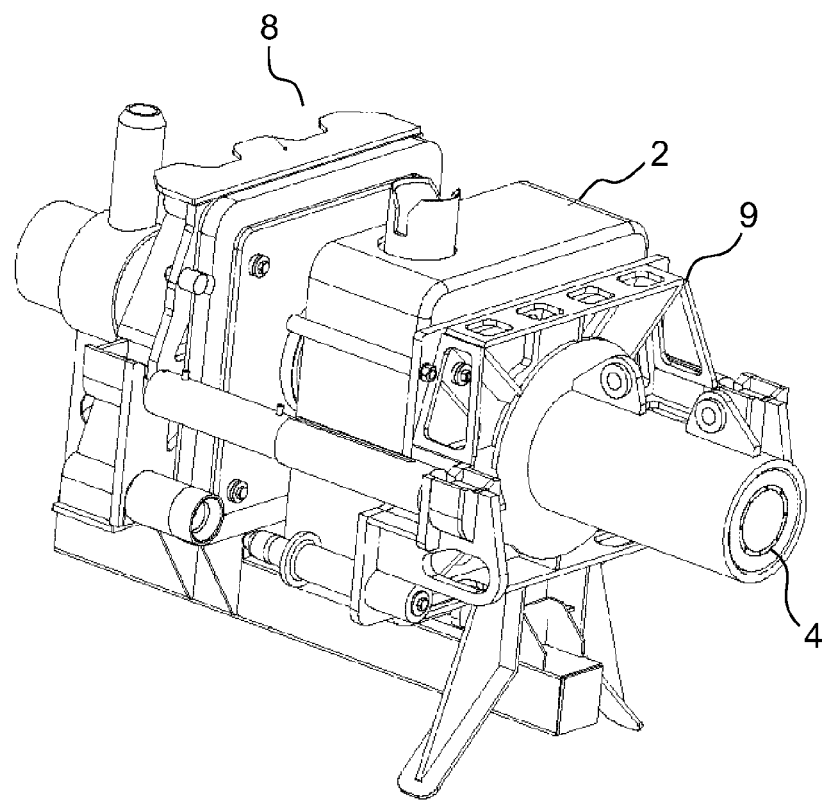
FIG. 3 shows an example of a subsea connector system to which the present invention may be applied.
Figure 4:
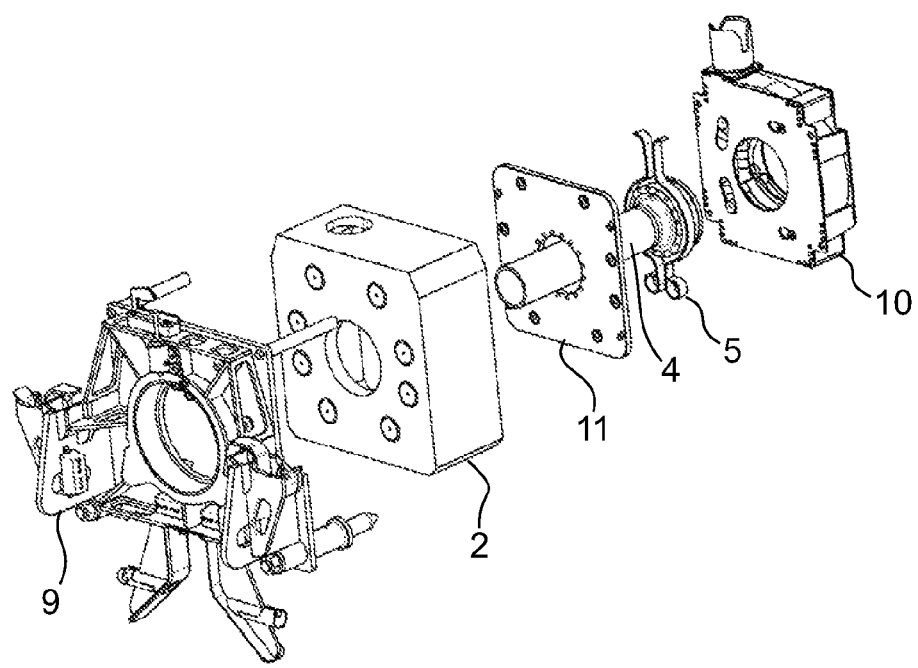
FIG. 4 shows an exploded view of one half of a connector constituting an outboard part of the system according to FIG. 3.

As illustrated in FIGS. 3 and 4, by way of example, the present invention can be used in a subsea connector system inside a Heat Bank casing 2 that insulates remotely operated mechanical connectors on subsea piping. The connector system comprises an inboard porch 8 mounted on a permanent structure (not shown) on the seabed and an outboard (removable) porch 9 attached to a pipe spool 4 that is attached to a pipeline (not shown), for example. FIG. 4 shows an exploded view of the outboard part of the insulated connector system in FIG. 3 that brings two pipe hubs into engagement. The guiding means 5 is enclosed between a clamp device 10 and a plate 11 so as to prevent the fluid from escaping out of the guide arrangement.

The clamp device 10 is arranged to grip two pipe hubs together to make a high pressure seal. The connector is insulated in order to prevent a cold spot developing in the production fluid that could form hydrates and thus a hydrate plug. Because the clamp device 10 needs freedom of movement, an insulated Heat Bank encloses the assembly and traps a volume of heat storing fluid, e.g. seawater. This trapped volume may, for example, contain some 200 liters of fluid that is heated by the hydrocarbon production flowing through the pipe spool 4.

Typically it may take up to 24 hours in order for the trapped fluid volume to reach full steady state temperature, much longer than for a typical insulated piping. For the best performance of this insulation system it is important that the heat storing fluid is heated as quickly and uniformly as possible in case an unexpected shut down should occur. By stimulating the circulation of heated fluid and minimizing temperature stratification, the arrangement and the method according to the present invention speeds up the heating process to protect one or more components, for example a subsea connector, against too rapid cooling due to unexpected production shut downs.

The invention is of course not in any way restricted to the preferred embodiments described above. On the contrary, many possibilities to modifications thereof will be apparent to a person with ordinary skill in the art without departing from the basic idea of the invention such as defined in the appended claims.

The invention claimed is:

1. An arrangement for heat transport used for thermally insulating at least one subsea tubular containing hydrocarbons, comprising:
   a thermally insulating casing arranged to enclose a fluid having heat-storing capacity so as to prevent the fluid from flowing out into surroundings of the casing, said casing having an internal space for receiving said at least one tubular and said fluid with the fluid surrounding the at least one tubular so as to allow the fluid to delay cooling of the at least one tubular, by heat stored in the fluid, and
   a guide arranged in the internal space of the casing, the guide being arranged to divide the internal space of the casing into different zones in fluid communication with each other, the guide being arranged to form a channel that encloses at least a part of the at least one tubular and through which fluid heated by said at least one tubular will flow upwards so as to flow out through an upper outlet of the channel at the top of said internal space into an adjacent zone that is also in fluid communication with a lower inlet of the channel at the bottom of said internal space, so as to guide the fluid in said internal space in such a manner that a circulation and mixing of the fluid will be generated essentially throughout said internal space under the action of occurring temperature differences in the fluid, whereby the natural tendency for temperature stratification of the fluid is counteracted or eliminated.

* * * * *